(12) United States Patent
Wada

(10) Patent No.: US 10,386,665 B2
(45) Date of Patent: Aug. 20, 2019

(54) OPTICAL ELEMENT PACKAGE

(71) Applicant: FUJIKURA LTD., Tokyo (JP)

(72) Inventor: Hideyuki Wada, Sakura (JP)

(73) Assignee: FUJIKURA LTD., Tokyo (JP)

( * ) Notice: Subject to any disclaimer, the term of this patent is extended or adjusted under 35 U.S.C. 154(b) by 50 days.

(21) Appl. No.: 15/508,246

(22) PCT Filed: Sep. 20, 2016

(86) PCT No.: PCT/JP2016/077654
§ 371 (c)(1),
(2) Date: Mar. 2, 2017

(87) PCT Pub. No.: WO2017/110176
PCT Pub. Date: Jun. 29, 2017

(65) Prior Publication Data
US 2018/0113351 A1    Apr. 26, 2018

(30) Foreign Application Priority Data
Dec. 24, 2015  (JP) ................................ 2015-252131

(51) Int. Cl.
G02F 1/1333    (2006.01)
G02F 1/1339    (2006.01)
G02F 1/1362    (2006.01)

(52) U.S. Cl.
CPC ...... *G02F 1/133308* (2013.01); *G02F 1/1339* (2013.01); *G02F 1/133382* (2013.01);
(Continued)

(58) Field of Classification Search
CPC ......... G02F 1/133308; G02F 1/136277; G02F 1/1339; G02F 1/133382; G02F 2001/133331; G02F 2203/02
(Continued)

(56) References Cited

U.S. PATENT DOCUMENTS 6,768,532 B1 *   7/2004  Sekiguchi ......... G02F 1/134309
                                               349/144
2003/0128307 A1 *  7/2003  Ito ..................... G02F 1/133308
                                               349/58
(Continued)

FOREIGN PATENT DOCUMENTS

DE    10 2013 203 531 B3    5/2014
JP        10123983 A  *    5/1998
(Continued)

OTHER PUBLICATIONS

International Search Report dated Nov. 22, 2016, issued in counterpart International Application PCT/JP2016/077654.
(Continued)

*Primary Examiner* — Hoan C Nguyen
(74) *Attorney, Agent, or Firm* — Westerman, Hattori, Daniels & Adrian, LLP

(57) ABSTRACT

The present disclosure describes increasing a maximum angle of incidence and a maximum angle of output, of an optical element package, with respect to an optical element contained therein, the optical element being reflective. A sealing resin (5) is filled into a gap between an LCOS element (2) and a package housing (1). The sealing resin (5) covers side surfaces (2s) and a rear surface (2b) of the LCOS element (2).

8 Claims, 3 Drawing Sheets

(52) U.S. Cl.
CPC ............... *G02F 1/136277* (2013.01); *G02F 2001/133311* (2013.01); *G02F 2001/133331* (2013.01); *G02F 2203/02* (2013.01)

(58) Field of Classification Search
USPC .......................................................... 349/58
See application file for complete search history.

(56) References Cited

U.S. PATENT DOCUMENTS

| | | | |
|---|---|---|---|
| 2007/0058135 | A1 | 3/2007 | Morikawa et al. |
| 2009/0185101 | A1* | 7/2009 | Matsuhira ............ G02F 1/1339 349/58 |
| 2009/0290113 | A1* | 11/2009 | Nakahata ............ B32B 38/1866 349/138 |
| 2011/0261282 | A1* | 10/2011 | Jean .................. G02F 1/133308 349/58 |
| 2012/0162880 | A1* | 6/2012 | Yoon ........................ H04N 5/64 361/679.01 |
| 2014/0102922 | A1 | 4/2014 | Imai |
| 2015/0055034 | A1 | 2/2015 | Pipitone et al. |
| 2016/0009226 | A1 | 1/2016 | Krebs |

FOREIGN PATENT DOCUMENTS

| | | | | |
|---|---|---|---|---|
| JP | 11-327448 A | 11/1999 | | |
| JP | 2002-296568 A | 10/2002 | | |
| JP | 2003202550 A | * 7/2003 | ....... | G02F 1/133308 |
| JP | 2005-215335 A | 8/2005 | | |
| JP | 2010-9017 A | 1/2010 | | |
| JP | 2011-8105 A | 1/2011 | | |
| JP | 2012-220525 A | 11/2012 | | |
| JP | 2014-82348 A | 5/2014 | | |
| JP | 2015-31903 A | 2/2015 | | |
| WO | 2005/098532 A1 | 10/2005 | | |

OTHER PUBLICATIONS

Extended (supplementary) European Search Report dated Jul. 4, 2018, issued in counterpart European Application No. 16837996.4. (10 pages).
Office Action dated Mar. 12, 2019, issued in counterpart JP Application No. 2015-252131, with English translation (4 pages).
Decision to Grant a Patent dated May 7, 2019, issued in counterpart JP Application No. 2015-252131, with English machine translation. (3 pages).

* cited by examiner

OPTICAL ELEMENT PACKAGE

TECHNICAL FIELD

The present invention relates to an optical element package in which an optical element, being reflective, is contained.

BACKGROUND ART

A conventional optical element package is configured to include a housing and a lid thereof, which lid has an aperture through which light from outside the optical element package is incident upon an optical element in the housing. In order to hermetically seal the optical element, a light-transmitting glass member is provided so as to cover the aperture.

Patent Literature 1 discloses an optical switch module (optical element package) including a MEMS (Micro Electro Mechanical System) mirror array, as an optical element, in a housing. The optical element package includes a lid frame on an upper portion of the housing, and a glass member (sapphire in a plate-like form) is fixed to the lid frame via a fixing member. The lid frame has a rectangular aperture in its center, which aperture is covered by the glass member.

Patent Literature 2 discloses an optical element package (optical element containment package) including a wavelength tunable interference filter, as an optical element, in a housing. The optical element package includes a lid on an upper portion of the housing, and a first window member is bonded to an outside of the lid, while a second window member is bonded to an inside of the lid. The lid has a circular aperture in its center, which aperture is covered by the first window member and the second window member.

Patent Literature 3 discloses an optical element package including a wavelength tunable interference filter, as an optical element, in a housing. The optical element package includes a lid on an upper portion of the housing, and a glass member is fixed to the lid via a fixing member. The lid has a circular aperture in its center, which aperture is covered by the glass member.

CITATION LIST

Patent Literature

[Patent Literature 1]
Japanese Patent Application Publication, Tokukai, No. 2011-8105 (Publication date: Jan. 13, 2011)
[Patent Literature 2]
Japanese Patent Application Publication, Tokukai, No. 2014-82348 (Publication date: May 8, 2014)
[Patent Literature 3]
Japanese Patent Application Publication, Tokukai, No. 2015-31903 (Publication date: Feb. 16, 2015)

SUMMARY OF INVENTION

Technical Problem

Unfortunately, the conventional optical element package has a problem that the lid blocks (i) incident light having a large angle of incidence with respect to a direction normal to a front surface of the optical element and (ii) light outputted by the optical element (for example, reflected light) which light has a large angle of output with respect to the direction normal to the front surface of the optical element. In other words, the angle of incidence and the angle of output each have a maximum value (hereinafter respectively referred to as a "maximum angle of incidence" and a "maximum angle of output").

The maximum angle of incidence is defined by (i) a size of the aperture and (ii) a distance between the front surface of the optical element and a top of the aperture. In order to increase the maximum angle of incidence, it is preferable that (i) the aperture is sufficiently large with respect to a size of an effective region of the optical element and (ii) the distance between the front surface of the optical element and the top of the aperture is as small as possible. The same applies to the maximum angle of output.

With the conventional optical element package, however, increasing the size of the aperture directly causes an increase in a size of the optical element package. This makes it impractical to set the size of the aperture to be larger than the effective region of the optical element.

Furthermore, the distance between (i) the front surface of the optical element and (ii) the top of the aperture formed in the lid must be at least equivalent to a thickness of the lid. In order to secure strength of the housing, there is a minimum possible value to which the thickness of the lid can be set. As such, it is impractical to set the distance to be exceedingly short. Note that, as illustrated in FIG. 3 of Patent Literature 1, the distance is greater than the thickness of the lid because (i) the window member is provided between the optical element and the lid and (ii) the optical element and the window member are separated from each other.

Thus, as explained above, it is difficult to (i) set the size of the aperture to be larger than the effective region of the optical element and (ii) set the distance between the front surface of the optical element and the top of the aperture to be small. This makes it difficult, in the conventional optical element package, to increase the maximum angle of incidence and the maximum angle of output.

The present invention has been made in view of the above problems. An object of the present invention lies in increasing a maximum angle of incidence and a maximum angle of output, of an optical element package, with respect to an optical element contained therein, the optical element being reflective.

Solution to Problem

In order to solve the above problem, an optical element package in accordance with an aspect of the present invention includes: a housing including a bottom plate and a side plate; and an optical element, being reflective, which (i) is contained in the housing and (ii) has a front surface including an effective region, the front surface being covered by a transparent member, a gap between the optical element and the housing being filled with a sealing resin which covers (i) side surfaces of the optical element and (ii) a rear surface of the optical element.

Advantageous Effects of Invention

An aspect of the present invention makes it possible to increase an angle of incidence and an angle of output in an optical element package which includes an optical element, being reflective, in its housing.

Figure 3:
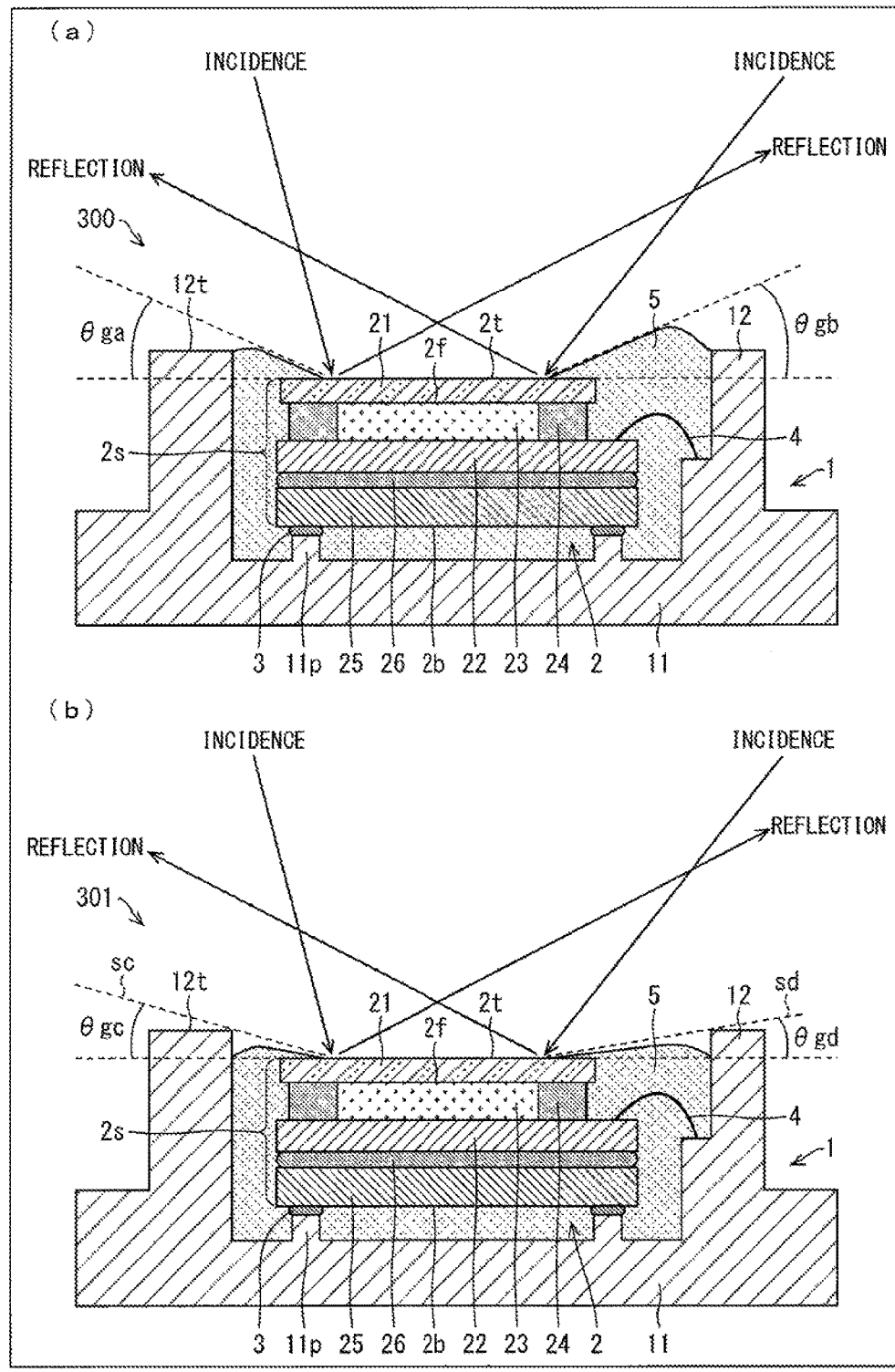

(a) and (b) of FIG. 3 are each a cross-sectional view illustrating an optical element package in accordance with Embodiment 3 of the present invention.

Figure 4:
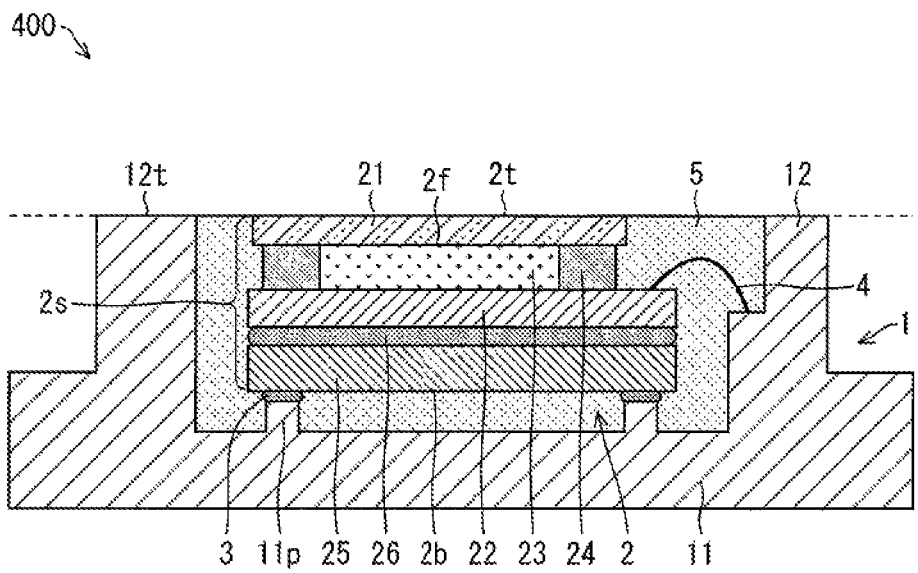

FIG. 4 is a cross-sectional view illustrating an optical element package in accordance with Embodiment 4 of the present invention.

Figure 5:
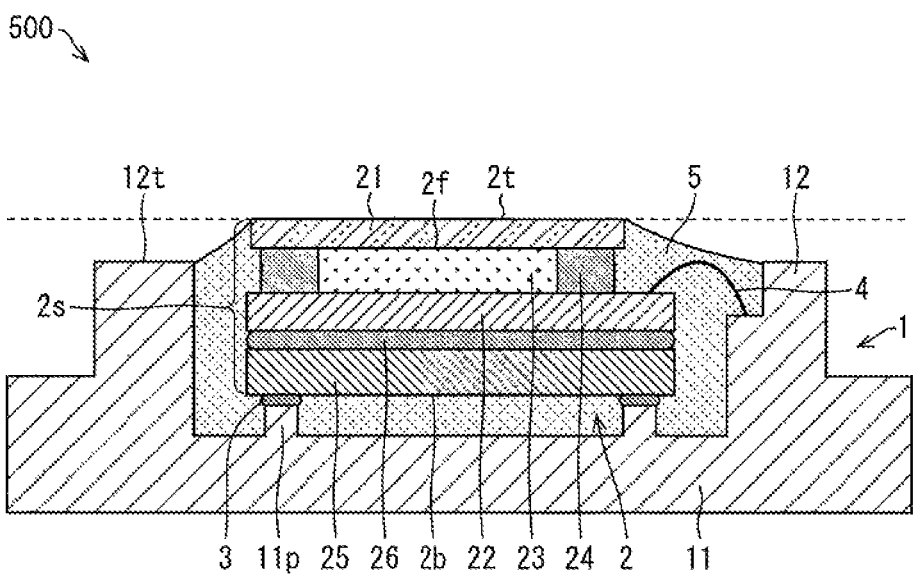

FIG. 5 is a cross-sectional view illustrating an optical element package in accordance with Embodiment 5 of the present invention.

DESCRIPTION OF EMBODIMENTS

The following description will discuss embodiments of the present invention with reference to FIGS. 1 through 5. Note that, for convenience, in each of the following embodiments, members having functions identical to those of the respective members described in another embodiment are given respective identical reference numerals, and a duplicate description of those members is omitted.

Embodiment 1

Figure 1:
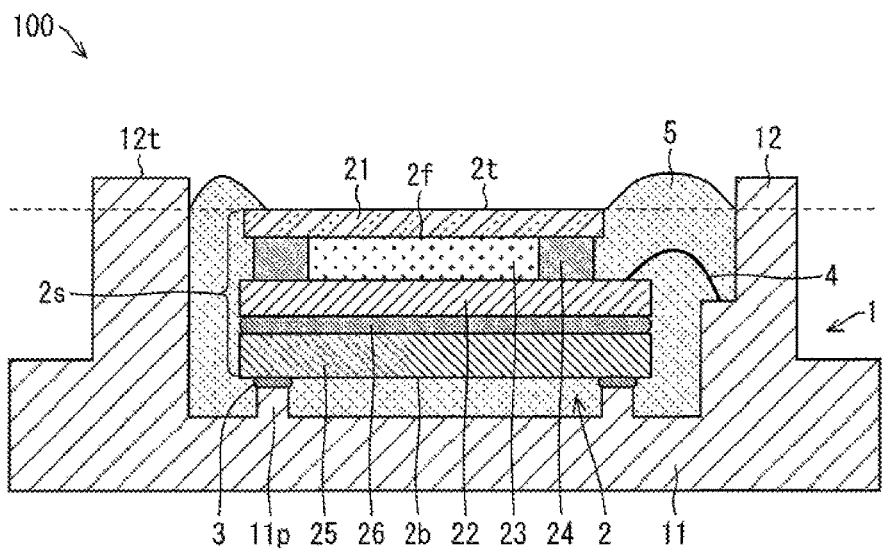
FIG. 1 is a cross-sectional view illustrating an optical element package in accordance with Embodiment 1 of the present invention.

FIG. 1 is a cross-sectional view illustrating an optical element package 100 in accordance with Embodiment 1 of the present invention. The optical element package 100 includes a package housing (housing) 1, an LCOS element (optical element) 2, a fixing resin (fixing member) 3, a bonding wire 4, and a sealing resin 5.

The package housing 1 is a square-shaped housing constituted by a bottom plate 11 and a side plate 12. The LCOS element 2, the fixing resin 3, the bonding wire 4, and the sealing resin 5 are each contained in the package housing 1. The bottom plate 11 has a protruding section (fixing member) 11p formed thereon. The protruding section 11p is formed to be frame-like or in the form of at least three (3) columns (provided that the columns are not all aligned along a single straight line).

The LCOS element 2 is a reflective optical element which (i) is contained in the package housing 1 and (ii) has a front surface 2f including an effective region, which front surface 2f is covered by a cover glass (transparent member) 21. The LCOS element 2 includes the cover glass 21, a substrate 22 made of silicon on which substrate a control circuit (not shown) is provided, a liquid crystal layer 23, a sealing member 24, a heater 25, and an adhesive resin 26. The optical element package 100 is configured such that a top 2t of the LCOS element 2 is positioned lower than a top 12t of the side plate 12.

The substrate 22 is provided so as to be opposite the cover glass 21. The liquid crystal layer 23 is provided so as to be sandwiched between the cover glass 21 and the substrate 22. Note that an upper surface of the liquid crystal layer 23 corresponds to the effective region of the LCOS element 2. The sealing member 24 is made of resin and is provided so as to (i) be sandwiched between the cover glass 21 and the substrate 22 and (ii) surround the liquid crystal layer 23 from four sides. The sealing member 24, the cover glass 21, and the substrate 22 form a chamber in which the liquid crystal layer 23 is contained. The sealing member 24 can be made of, for example, (i) a photosensitive epoxy resin and/or (ii) a resin containing an acrylate compound. Note that a transparent conductive film and/or the like can be provided on an inner side of the cover glass 21, and an AR coating (anti-reflective coating) and/or the like can be provided on an outer side of the cover glass 21.

It is necessary to carefully manage the temperature of the LCOS element 2, and the heater 25 serves to control this temperature. The heater 25 is provided on the protruding section 11p. The adhesive resin 26 serves to bond the substrate 22 to the heater 25. Specifically, the adhesive resin 26 bonds (i) a surface of the substrate 22, which surface faces away from the liquid crystal layer 23, to (ii) a surface of the heater 25, which surface faces away from the protruding section 11p.

The fixing resin 3 serves to fix the heater 25 to the protruding section 11p. In a case where the protruding section 11p is configured to be constituted by three (3) or more columnar members, the fixing resin 3 can be applied to each of the columnar members constituting the protruding section 11p. In a case where the protruding section 11p is configured to be frame-like, the fixing resin 3 can be applied to a top surface of the protruding section 11p. The bonding wire 4 serves to electrically connect the package housing 1 to the substrate 22 of the LCOS element 2.

The sealing resin 5 is filled into a gap between the LCOS element 2 and the package housing 1. The sealing resin 5 covers side surfaces 2s and a rear surface 2b of the LCOS element 2. As such, the front surface 2f of the LCOS element 2 is covered by the cover glass 21, while the rear surface 2b and the side surfaces 2s of the LCOS element 2 are covered by the sealing resin 5. This makes it possible to hermetically seal the LCOS element 2 without providing a lid that could potentially block (i) light incident on the LCOS element 2 and (ii) light reflected by the LCOS element 2. It is therefore possible, with the optical element package 100, to increase the maximum angle of incidence and the maximum angle of output. Note that since a lid is unnecessary the optical element package 100 makes possible a configuration having a reduced number of parts. This allows for a reduction in the amount of space which needs to be secured around the LCOS element 2 and therefore enables a reduction in size of the optical element package 100.

With the configuration of the optical element package 100, the cover glass 21 is exposed to the atmosphere. This makes it easy to remove any foreign object which may be on the cover glass 21.

Note also that the sealing resin 5 surrounds the sealing member 24 of the LCOS element 2 from four sides. This makes it possible to prevent the sealing member 24 from being exposed and, therefore, makes it possible to enhance moisture resistance and waterproofness of the LCOS element 2.

The following description will discuss, in further detail, an advantage of a configuration in which the sealing resin 5 covers the side surfaces 2s of the LCOS element 2 (and, in particular, surrounds the sealing member 24 from four sides). In a case where the sealing member 24 is made of a photosensitive epoxy resin and/or a resin containing an acrylate compound as described above, there is a risk that moisture will penetrate through the sealing member 24. A configuration in which the sealing 5 covers the side surfaces 2s (and, in particular, surrounds the sealing member 24 from four sides) is preferable because such a configuration makes it possible to prevent such penetration.

The sealing resin 5 can be made of a light-blocking resin (for example, a black resin) or a light-transmitting resin. A configuration where the sealing resin 5 is made from a light-blocking resin makes it possible to suppress stray light. A configuration where the sealing resin 5 is made from a light-transmitting resin makes it possible for an inspector to visually inspect the interior of the package housing 1.

The sealing resin 5 is preferably made from a resin having superior properties with regards to at least one of damp-proofness, waterproofness, and chemical resistance. A resin having superior chemical resistance can also be said to have adequate resistance against corrosive gases. Examples of such a resin encompass a fluorosilicone gel, a fluorine gel, and a PPS (polyphenylene sulfide) resin.

The sealing resin 5 is preferably in a gel form. Because the protruding section 11p and the fixing resin 3 serve to fix the LCOS element 2 to the package housing 1, the sealing resin 5 does not need to have a post-curing hardness sufficient for fixing the LCOS element 2 to the package housing 1. By not having a post-curing hardness sufficient for fixing the LCOS element 2 to the package housing 1, a resin in a gel form avoids creating stress strong enough to cause skewing of the LCOS element 2 during curing. This makes it possible for the LCOS element 2 to be contained in the optical element package 100 without being skewed. Examples of such a resin in a gel form encompass soft coating resins in a gel form, such as a silicone gel or a fluorosilicone gel.

Note that although Embodiment 1 employs a configuration where a bottom surface of the heater 25 is fixed to the protruding section 11p, it is also possible to employ an alternative configuration where, for example, a member other than the heater 25 is fixed to the protruding section 11p. For example, it is possible to employ a configuration where (i) the cover glass 21 has a size larger than the sealing member 24, and (ii) a portion of the cover glass 21, which portion extends past the sealing member 24, is fixed to the protruding section 11p. In such a case, the protruding section 11p can be configured to have a taller height.

Embodiment 2

Figure 2:
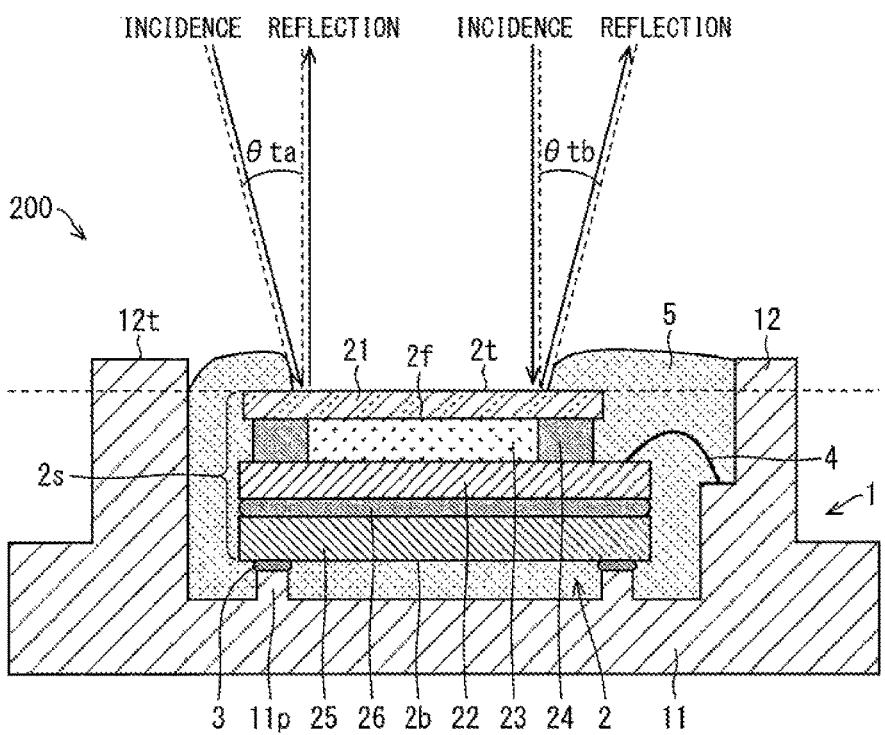
FIG. 2 is a cross-sectional view illustrating an optical element package in accordance with Embodiment 2 of the present invention.

FIG. 2 is a cross-sectional view illustrating an optical element package 200 in accordance with Embodiment 2 of the present invention. The optical element package 200 has a configuration which differs from that of the optical element package 100 with regards to the following points.

In Embodiment 2, the front surface 2f of the LCOS element 2 includes (i) an effective region (corresponding to the upper surface of a liquid crystal layer 23 and (ii) a non-effective region surrounding the effective region. Note that an upper surface of a sealing member 24 corresponds to the non-effective region. The sealing resin 5 of Embodiment 2 further covers a region along an outer periphery of the non-effective region.

This makes it possible to more reliably prevent the sealing member 24 of the LCOS element 2 from being exposed, in comparison to a configuration where the sealing resin 5 does not cover the front surface 2f of the LCOS element 2 at all. This makes it possible to further enhance moisture resistance and waterproofness of the LCOS element 2.

Note here that it is preferable that the sealing resin 5 on the LCOS element 2 is formed to have inner walls whose respective angles of inclination $\theta ta$ and $\theta tb$ are each greater than 10° with respect to a direction of height of the optical element package 200. This is because, in the optical element package 200, light incident on the LCOS element 2 and/or light reflected by the LCOS element 2 will commonly have an angle of inclination of 10° or greater with respect to the direction of height of the optical element package 200.

Embodiment 3

(a) of FIG. 3 is a cross-sectional view illustrating an optical element package 300 in accordance with Embodiment 3 of the present invention. The optical element package 300 has a configuration which differs from that of the optical element package 100 with regards to the following points.

In Embodiment 3, the sealing resin 5 is filled, into the gap between the LCOS element 2 and the package housing 1, so as to rise to a position higher than (i) the top 12t of the side plate 12 and (ii) the top 2t of the LCOS element 2. Furthermore, the sealing resin 5 has angles of elevation $\theta ga$ and $\theta gb$ each having a maximum value that is less than 10°, the angles of elevation $\theta ga$ and $\theta gb$ each being obtained in a case where the sealing resin 5 is viewed from an outer edge of the effective region in a direction toward the outside of the effective region. Note here that the outer edge of the effective region refers to a position of a point obtained by projecting any point of a contour of the liquid crystal layer 23 onto a front surface of the cover glass 21.

(b) of FIG. 3 is a cross-sectional view illustrating an optical element package 301 in accordance with Embodiment 3 of the present invention. The optical element package 301 has a configuration which differs from that of the optical element package 100 with regards to the following points.

The optical element package 301 is similar to the optical element package 100 in that the top 2t of the LCOS element 2 is positioned to be lower than the top 12t of the side plate 12. In the optical element package 301, however, the sealing resin 5 is filled into the gap between the LCOS element 2 and the package housing 1 so as to be only in a region below imaginary straight lines sc and sd, each of which connects (i) the outer edge of the effective region to (ii) the top 12t of the side plate 12 along the shortest possible distance. Furthermore, the side plate 12 has angles of elevation $\theta gc$ and $\theta gd$ each having a maximum value that is less than 10°, the angles of elevation $\theta gc$ and $\theta gd$ each being obtained in a case where the side plate 12 is viewed from the outer edge of the effective region in a direction toward the outside of the effective region.

The maximum angle of incidence and the maximum angle of output at the outer edge of the effective region are each obtained by subtracting the maximum value of a respective angle of elevation from 90°. The optical element packages 300 and 301 make it possible to set each of the maximum angle of incidence and the maximum angle of output at the outer edge of the effective region to be 80° or greater. That is, with the optical element packages 300 and 301, it is possible to set the maximum angle of incidence and the maximum angle of output of the optical element package to be 80° or greater.

This also makes it possible to suppress an effect, of reflection from an optical part outside the LCOS element 2, on light incident on and output by the LCOS element 2. As such, it is possible to better isolate a signal in each port and suppress crosstalk.

Embodiment 4

FIG. 4 is a cross-sectional view illustrating an optical element package 400 in accordance with Embodiment 4 of the present invention. The optical element package 400 has a configuration which differs from that of the optical element package 100 with regards to the following points.

The optical element package 400 is configured such that (i) the top 2t of the LCOS element 2 has a height equivalent to that of the top 12t of the side plate 12 and (ii) a sealing resin 5 is provided only up to the same height as the top 2t of the LCOS element 2. In this configuration, there are no members above or beside the effective region which members would block incident light and output light. It is therefore possible, with the optical element package 400, to maximize the maximum angle of incidence and the maximum angle of output.

Embodiment 5

FIG. 5 is a cross-sectional view illustrating an optical element package 500 in accordance with Embodiment 5 of the present invention. The optical element package 500 has a configuration which differs from that of the optical element package 100 with regards to the following points.

The optical element package 500 is configured such that (i) the top 2t of the LCOS element 2 is positioned to be higher than the top 12t of the side plate 12 and (ii) the sealing resin 5 is provided only up to the same height as the top 2t of the LCOS element 2. In this configuration, there are no members above or beside the effective region which members would block incident light and output light. It is therefore possible, with the optical element package 500, to maximize the maximum angle of incidence and the maximum angle of output.

Additional Remarks

An optical element package in accordance with an aspect of the present invention includes: a housing including a bottom plate and a side plate; and an optical element, being reflective, which (i) is contained in the housing and (ii) has a front surface including an effective region, the front surface being covered by a transparent member, a gap between the optical element and the housing being filled with a sealing resin which covers (i) side surfaces of the optical element and (ii) a rear surface of the optical element.

With the configuration, the front surface of the optical element is covered by the transparent member, while the rear surface and the side surfaces of the optical element are covered by the sealing resin. This configuration therefore makes it possible to hermetically seal the optical element without providing a lid that could potentially block light incident on the optical element and light reflected by the optical element. It is therefore possible to increase the maximum angle of incidence and the maximum angle of output in comparison with the respective optical element packages of Patent Literatures 1 through 3.

An optical element package in accordance with another aspect of the present invention is configured such that: the optical element is an LCOS element including: the transparent member; a substrate provided opposite the transparent member; a liquid crystal layer sandwiched between the transparent member and the substrate; and a sealing member, made of resin, which (i) is sandwiched between the transparent member and the substrate and (ii) surrounds the liquid crystal layer from four sides, and the sealing resin surrounds the sealing member from four sides.

The configuration makes it possible to prevent the sealing member of the LCOS element from being exposed and, therefore, makes it possible to enhance moisture resistance and waterproofness of the LCOS element.

An optical element package in accordance with another aspect of the present invention is configured such that: the front surface of the optical element includes the effective region and a non-effective region surrounding the effective region; and the sealing resin further covers a region along an outer periphery of the non-effective region.

The configuration makes it possible to more reliably prevent the sealing member of the LCOS element from being exposed, in comparison to a configuration where the sealing resin does not cover the front surface of the LCOS element at all. This makes it possible to further enhance moisture resistance and waterproofness of the LCOS element.

An optical element package in accordance with another aspect of the present invention is configured such that: the sealing resin is filled into the gap between the optical element and the housing so as to rise to a position higher than (i) a top of the side plate and (ii) the front surface of the optical element; and the sealing resin has an angle of elevation whose maximum value is less than 10°, the angle of elevation being obtained in a case where the sealing resin is viewed from an outer edge of the effective region in a direction toward an outside of the effective region.

The maximum angle of incidence and the maximum angle of output at the outer edge of the effective region are each obtained by subtracting the maximum value of the angle of elevation from 90°. With the configuration, it is possible to set each of the maximum angle of incidence and the maximum angle of output at the outer edge of the effective region to be 80° or greater. That is, it is possible to set the maximum angle of incidence and the maximum angle of output of the optical element package to be 80° or greater.

An optical element package in accordance with another aspect of the present invention is configured such that: the front surface of the optical element is positioned to be lower than a top of the side plate; the sealing resin is filled into the gap between the optical element and the housing so as to be in a region below an imaginary straight line connecting (i) an outer edge of the effective region and (ii) the top of the side plate; and the side plate has an angle of elevation whose maximum value is less than 10°, the angle of elevation being obtained in a case where the side plate is viewed from the outer edge of the effective region in a direction toward an outside of the effective region.

The maximum angle of incidence and the maximum angle of output at the outer edge of the effective region are each obtained by subtracting the maximum value of the angle of elevation from 90°. With the configuration, it is possible to set each of the maximum angle of incidence and the maximum angle of output at the outer edge of the effective region to be 80° or greater. That is, it is possible to set the maximum angle of incidence and the maximum angle of output of the optical element package to be 80° or greater.

An optical element package in accordance with another aspect of the present invention is configured such that: the front surface of the optical element is positioned to be at a height equal to or greater than that of a top of the side plate; and the sealing resin is filled to a position whose height is equal to or less than that of a top of the optical element.

In the configuration, there are no members above or beside the effective region which members would block incident light and output light. It is therefore possible to maximize the maximum angle of incidence and the maximum angle of output of the optical element package.

An optical element package in accordance with another aspect of the present invention is configured to further include a fixing member for fixing the optical element to a portion of the housing, the sealing resin being in a gel form.

With the configuration, because the fixing member serves to fix the optical element to the housing, the sealing resin does not need to have a post-curing hardness sufficient for fixing the optical element to the housing. By not having a post-curing hardness sufficient for fixing the optical element to the housing, a resin in a gel form avoids creating stress strong enough to cause skewing of the optical element during curing. This makes it possible for the optical element to be contained in the optical element package without being skewed.

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

1 Package housing (housing)
2 LCOS element (optical element)
2b Rear surface of LCOS element
2f Front surface of LCOS element
2s Side surface of LCOS element
2t Top of LCOS element
3 Fixing resin (fixing member)
4 Bonding wire
5 Sealing resin
11 Bottom plate
11p Protruding section (fixing member)
12 Side plate
12t Top of side plate
21 Cover glass (transparent member)
22 Substrate
23 Liquid crystal layer
24 Sealing member
25 Heater
26 Adhesive resin
100, 200, 300, 301, 400, 500 Optical element package
θga, θgb, θgc, θgd Angle of elevation

The invention claimed is:

1. An optical element package comprising:
a housing including a bottom plate and a side plate; and
an optical element, being reflective, which (i) is contained in the housing and (ii) has a front surface including an effective region, the front surface being covered by a transparent member,
gaps between the housing and side surfaces of the optical element and a gap between the housing and a rear surface of the optical element being filled with a resin which covers (i) entire parts of the side surfaces of the optical element and (ii) entire part of the rear surface of the optical element,
wherein:
the resin is disposed so as to rise to a position higher than (i) a top of the side plate and (ii) the front surface of the optical element; and
the resin has an angle of elevation whose maximum value is less than 10°, the angle of elevation being obtained in a case where the resin is viewed from an outer edge of the effective region in a direction toward an outside of the effective region.

2. The optical element package as set forth in claim 1, further comprising a fixing member for fixing the optical element to a portion of the housing,
the resin being in a gel form.

3. The optical element package as set forth in claim 1, wherein:
the resin directly contacts (i) the entire parts of the side surfaces of the optical element and (ii) the entire part of the rear surface of the optical element.

4. The optical element package as set forth in claim 3, further comprising a fixing member for fixing the optical element to a portion of the housing, the resin being in a gel form.

5. An optical element package comprising:
a housing including a bottom plate and a side plate; and
an optical element, being reflective, which (i) is contained in the housing and (ii) has a front surface including an effective region, the front surface being covered by a transparent member,
gaps between the housing and side surfaces of the optical element and a gap between the housing and a rear surface of the optical element being filled with a resin which covers (i) entire parts of the side surfaces of the optical element and (ii) entire part of the rear surface of the optical element,
wherein:
the front surface of the optical element is positioned to be lower than a top of the side plate;
the resin is so as to be in a region below an imaginary straight line connecting (i) an outer edge of the effective region and (ii) the top of the side plate; and
the side plate has an angle of elevation whose maximum value is less than 10°, the angle of elevation being obtained in a case where the side plate is viewed from the outer edge of the effective region in a direction toward an outside of the effective region.

6. The optical element package as set forth in claim 5, further comprising a fixing member for fixing the optical element to a portion of the housing,
the resin being in a gel form.

7. The optical element package as set forth in claim 5, wherein:
the resin directly contacts (i) the entire parts of the side surfaces of the optical element and (ii) the entire part of the rear surface of the optical element.

8. The optical element package as set forth in claim 7, further comprising a fixing member for fixing the optical element to a portion of the housing,
the resin being in a gel form.

* * * * *